United States Patent
Tange et al.

(10) Patent No.: US 6,505,111 B1
(45) Date of Patent: Jan. 7, 2003

(54) APPARATUS AND METHOD FOR AUTOMATICALLY CONTROLLING VEHICULAR VELOCITY OF A VEHICLE

(75) Inventors: Satoshi Tange, Kanagawa; Kenichi Egawa, Tokyo, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/482,571

(22) Filed: Jan. 13, 2000

(30) Foreign Application Priority Data

Jan. 14, 1999 (JP) .......................................... 11-008368

(51) Int. Cl.$^7$ ................................................ G06F 7/00
(52) U.S. Cl. ............................ 701/96; 701/93; 701/95; 701/300; 342/70; 342/71; 340/901; 340/902; 340/903; 180/170
(58) Field of Search ........................... 701/93, 96, 300, 701/301, 95; 342/70, 71, 72, 47, 454, 455, 458, 456, 104, 106, 107, 109, 414, 418; 340/901, 902, 903; 180/170

(56) References Cited

U.S. PATENT DOCUMENTS 6,154,168 A    11/2000   Egawa et al. .................. 342/71
6,188,950 B1 * 2/2001   Tsutsumi et al. ............. 701/96

FOREIGN PATENT DOCUMENTS

JP            9-263160       10/1997

* cited by examiner

Primary Examiner—William A. Cuchlinski, Jr.
Assistant Examiner—Arthur D. Donnelly
(74) Attorney, Agent, or Firm—Foley & Lardner

(57) ABSTRACT

In apparatus and method for automatically controlling a vehicular velocity of an automotive vehicle maintaining an inter-vehicle distance to a preceding vehicle, a follow-up run controller determines whether such a follow-up run control as to control the vehicular velocity should be released or not according to a vehicular motion when a shift lever of an automatic transmission shift mechanism (or of a continuously variable transmission) is operated to shift a drive (D) range to a gear maintaining range (such as a second-speed range or third- speed range). If the shift operation occurs from the drive range to the 2nd-speed range during the follow-up run control, the engine speed N2nd in the second-speed range is estimated. If the engine speed N2nd is equal to or lower than a predetermined threshold value $N_{TH}$, the follow-up run control is continued. If the engine speed N2nd is in excess of the predetermined threshold value $N_{TH}$, the follow-up run control is released.

15 Claims, 6 Drawing Sheets

APPARATUS AND METHOD FOR AUTOMATICALLY CONTROLLING VEHICULAR VELOCITY OF A VEHICLE

BACKGROUND OF THE INVENTION a) Field of the Invention

The present invention relates to apparatus and method for automatically controlling a vehicular velocity of a vehicle which follows up a preceding vehicle running ahead of the vehicle if the preceding vehicle is present, maintaining an inter-vehicle distance to the preceding vehicle.

b) Description of the Related Art

A Japanese Patent Application First Publication No. Heisei 9-263160 published on Oct. 7, 1997 exemplifies a previously proposed automatic vehicular velocity controlling system.

In the disclosed vehicular velocity controlling system, such a cruise run control as to make the vehicular velocity coincident with a target vehicular velocity is carried out when an inter-vehicle distance between a preceding vehicle which is present ahead of the vehicle and the vehicle in which the vehicular velocity control system is equipped is equal to or wider than a constant value and such a follow-up run control as to maintain the inter-vehicle distance at the constant value is carried out when the inter-vehicle distance is narrower than the constant value.

When such a vehicular velocity control release condition is established as a brake pedal being depressed, as a manual clutch being depressed, as a release switch being operated, or as the vehicular velocity being equal to or lower than a controllable minimum vehicular velocity under one of the above-described control states, the vehicular velocity control is released.

SUMMARY OF THE INVENTION

However, in the previously proposed vehicular velocity controlling apparatus, the vehicular velocity control is released when the vehicular velocity control release condition such as a manipulation of the brake, a manipulation of the brake, a manipulation of the clutch, the operation of the release switch, or the vehicular velocity being equal to or lower than the controllable minimum vehicular velocity is established.

The other control release conditions may include such a case in which a select position of a vehicular automatic transmission is changed from a drive (D) range to a gear shift maintaining range such as a third-speed range (3rd range) or a second-speed range (2nd range) in order for a vehicular driver to determine that an acceleration or engine braking is demanded.

Suppose a case in which when a shift selection for the automatic transmission is carried out to transfer the gear-speed shift range such as 3rd range or 2nd range while the vehicular velocity control is effected, the vehicular velocity control is set to be released.

Hence, even in a case where the vehicular driver temporarily carries out the gear speed range shift operation, the vehicular velocity is released. Thereafter, it is necessary to set again the vehicular velocity control (function). This operation make the system troublesome whenever the temporary shift operation for the automatic transmission is carried out.

It is an object of the present invention to provide apparatus and method for automatically controlling a vehicular velocity for an automotive vehicle in which when a shift operation of a speed range in an automatic transmission occurs during the follow-up run control for the vehicle to follow up the preceding vehicle, with a vehicular behavior (motion) taken into consideration, a decision as to whether the follow-up run control should be released is made so that an unnecessary release is prevented and a re-setting operation can be omitted.

According to one aspect of the present invention, there is provided with an apparatus for automatically controlling a vehicular velocity for a vehicle, comprising: an inter-vehicle distance detector to detect an inter-vehicle distance of the vehicle to a preceding vehicle which is running ahead of the vehicle; a target vehicular velocity variation rate calculating section that calculates a target vehicular velocity variation rate to make the detected inter-vehicle distance substantially equal to a target inter-vehicle distance; an automatic vehicular velocity controlling section enabled to perform an automatic vehicular velocity control to maintain the target vehicular velocity variation rate calculated by the target vehicular velocity variation rate calculating section; a shift operation detector to detect whether a range selection by a vehicular driver occurs from a drive range to a gear speed maintaining range and vice versa; a vehicular motion predicting section that predicts a vehicular motion at the gear speed maintaining range when the shift operation detector detects that the range selection by the vehicular driver occurs from the drive range to the gear speed maintaining range; an automatic vehicular velocity control release determining section that determines whether the vehicular motion predicted by the vehicular motion predicting section falls within an allowable range when the shift operation detector detects that the range selection by the vehicular driver occurs from the drive range to the gear speed maintaining range; and an automatic vehicular velocity control releasing section that releases the automatic vehicular velocity control by the automatic vehicular velocity controlling section when the vehicular motion falls out of the allowable range but continues the automatic vehicular velocity control by the automatic vehicular velocity controlling section when the vehicular motion falls within the allowable range.

According to another aspect of the present invention, there is provided with a method for automatically controlling a vehicular velocity for a vehicle, comprising: detecting an inter-vehicle distance of the vehicle to a preceding vehicle which is running ahead of the vehicle; calculating a target vehicular velocity variation rate to make the detected inter-vehicle distance substantially equal to a target inter-vehicle distance; performing an automatic vehicular velocity control to maintain the target vehicular velocity variation rate; detecting whether a range selection by a vehicular driver occurs from a drive range to a gear speed maintaining range and vice versa; predicting a vehicular motion at the gear speed maintaining range when detecting that the range selection by the vehicular driver occurs from the drive range to the gear speed maintaining range; and determining whether the vehicular motion predicted falls within an allowable range when detecting that the range selection by the vehicular driver occurs from the drive range to the gear speed maintaining range; releasing the automatic vehicular velocity control in a case when the vehicular motion falls out of the allowable range; and continuing the automatic vehicular velocity control in a case when the vehicular motion falls within the allowable range.

DETAILED DESCRIPTION OF THE PREFERRED EMBODIMENTS

Reference will hereinafter be made to the drawings in order to facilitate a better understanding of the present invention.

(First Embodiment)

Figure 1A:
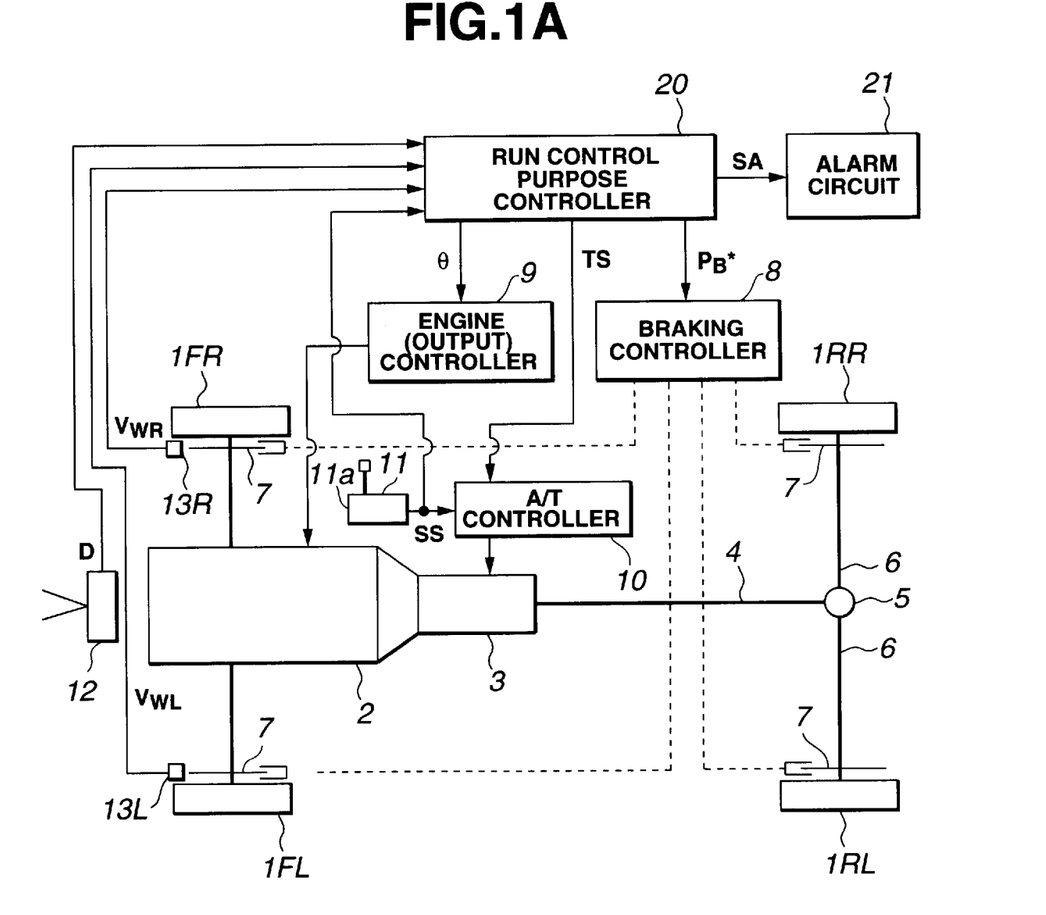
FIG. 1A is a rough configuration view representing a first preferred embodiment of an automatic vehicular velocity controlling apparatus according to the present invention.

FIG. 1 shows a rough configuration view of a front-engine rear-drive automotive vehicle to which an apparatus for automatically controlling a vehicular velocity in a first preferred embodiment according to the present invention is applicable.

In FIG. 1, 1FL and 1FR are front left and right road wheels as non-drive (steered) wheels and 1RL and 1RR are rear left and right road wheels as drive wheels. The rear left and right road wheels 1RL and 1RR are driven to rotate with a driving force generated from an engine 2, via a four-speed automatic transmission 3, a propeller shaft 4, a final speed reduction gear 5, and a wheel axle 6.

A disc brake 7 is installed which generates a driving force on each of the front left and right road wheels 1FL, 1FR, 1RR, and 1RL and the rear left and right road wheels 1RL and 1RR and whose braking hydraulic pressure is controlled by means of a braking controller 8.

The braking controller 8 generates the braking hydraulic pressure in accordance with a depression of a brake pedal (not shown). The braking hydraulic is generated in accordance with a braking pressure command value from a vehicular run control purpose controller 20 (hereinafter, also simply called a controller).

The engine 2 is provided with an engine (output) controller 9 which adjustably controls an output of the engine 2. The engine (output) controller 9 adopts a method of adjusting an opening angle of a throttle valve and a method of adjusting an opening angle of an idling control valve to control an idling revolution of the engine 2. In the first embodiment, the engine output controller 9 adopts the adjustment of the opening degree of the throttle valve.

Furthermore, the automatic transmission 3 is provided with a transmission controller 10 which controls a gear range position.

The automatic transmission controller 10 receives a shift command signal SS in accordance with a range position at which the vehicular driver selects with a shift lever 11a of a shift mechanism 11 and is constructed to perform an up-shift or down-shift of the present gear position of the automatic transmission 3 upon receipt of a shift up or shift down shift command value SS from the run control purpose controller 20.

On the other hand, wheel velocity sensors 13FL and 13FR are disposed to detect respective road wheel velocities of the front left and right road wheels 1FL and 1FR. A braking pressure sensor 17 detects a master cylinder pressure during a brake operation.

On the other hand, an inter-vehicle distance sensor 18 constituted by a radar unit is disposed on a front lower vehicular body part of the vehicle to detect an inter-vehicle distance L of the vehicle to the preceding vehicle which is running ahead of the vehicle.

Each output signal of the shift mechanism 11, the inter-vehicle distance sensor 18, and the road wheel velocity sensors 13FL and 13FR is inputted to the controller 20.

Figure 1B:
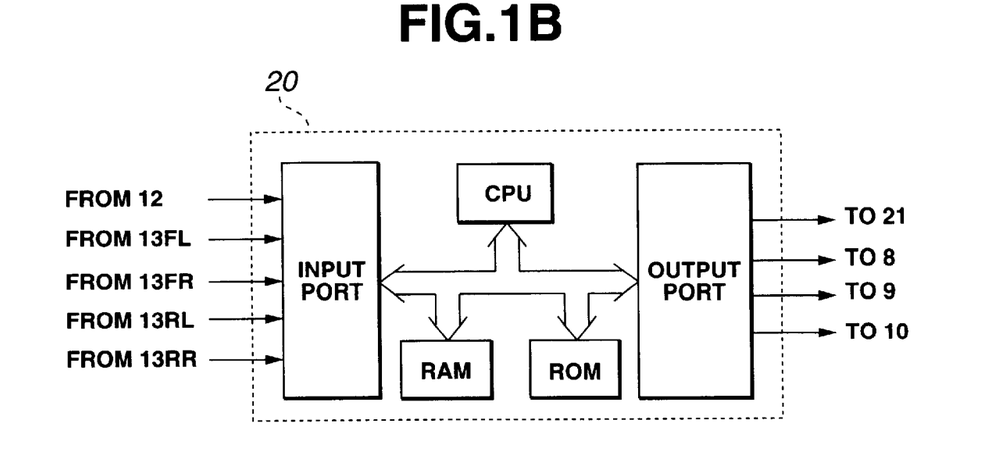
FIG. 1B is a schematic circuit block diagram of a follow-up run controller in the first embodiment shown in FIG. 1A.

The controller 20 manages the braking controller 8, the engine (output) controller 9, and the automatic transmission controller 10 on the basis of the inter-vehicle distance L detected by the inter-vehicle distance sensor 12 and the road wheel velocities VwL and VwR detected by the road wheel velocity sensors 13FL and 13FR. Hence, such a follow-up run control as to maintain an appropriate inter-vehicle distance between the preceding vehicle and the vehicle so as to follow up the preceding vehicle is carried out. Together with the follow-up run control, when the vehicular driver shifts a range selection lever of the automatic transmission 3 to select the gear speed range from the drive range (D) to a gear speed range maintaining its range such as a 2nd-speed range, the controller 20 determines if the follow-up run control should be released according to the instantaneous vehicular motion, i.e., the instantaneous engine speed.

Next, an operation of the first embodiment will be described with reference to follow-up run managing procedure shown in FIG. 2 and follow-up run control procedure shown in FIG. 3.

Figure 2:
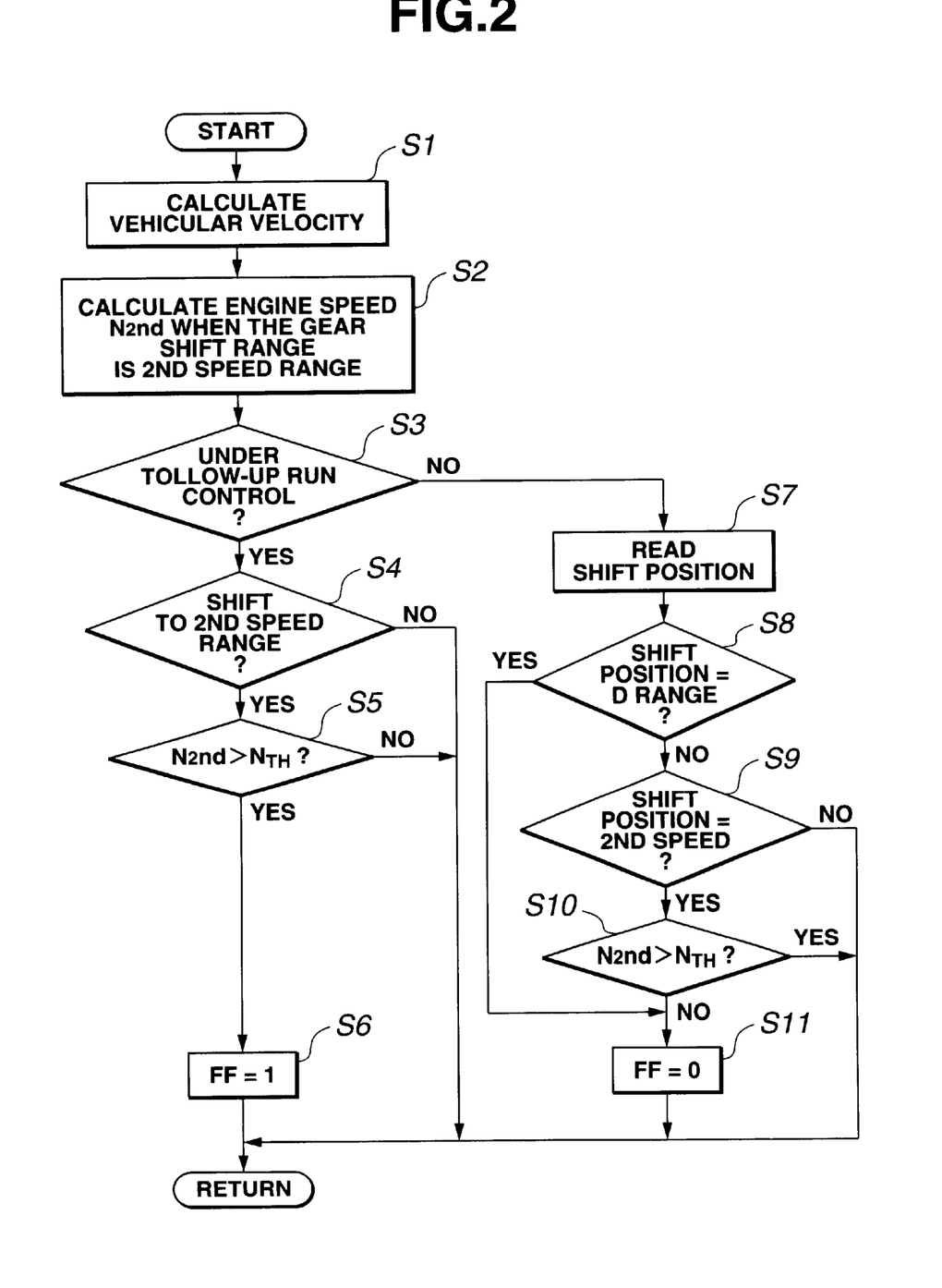
FIG. 2 is an operational flowchart representing one example of a follow-up run managing procedure executed by the controller shown in FIGS. 1A and 1B.

First, the follow-up run managing procedure shown in FIG. 2 is executed as a timer interrupt routine for each predetermined interval of time (for example, 5 milliseconds) with respect to a main routine.

At a step S1, the CPU of the controller 20 reads road wheel velocities VwL and VwR detected by the road wheel velocity sensors 13FL and 13FR, calculates an average value of the road wheel velocities to derive a vehicular velocity V(n).

Figure 4:
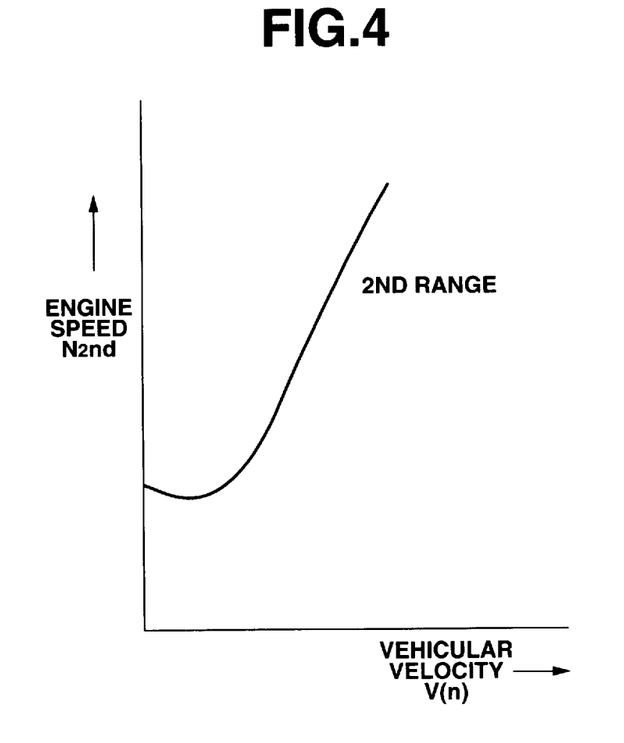
FIG. 4 is a characteristic graph representing a map of a relationship between a vehicular velocity and an engine speed in a 2nd speed range of a vehicular automatic transmission.

At the next step S2, the CPU of the controller 20 refers to, for example, an engine speed calculation map shown in FIG. 4 on the basis of the vehicular velocity V(n) and calculates an engine speed N2nd when the 2nd speed range is selected.

In this case, the engine speed calculation map is set, as shown in FIG. 4, so as to enable the calculation of the engine speed in accordance with the vehicular velocity V(n).

At the next step S3, the CPU of the controller 20 compares a control release flag FF which is reset to "0" at an initial stage of the vehicular state under the follow-up run control state with "0" so as to determine whether the control release flag FF is reset to "0" or set to "1". If FF="0" (Yes) at the step S3, the present timer interrupt routine goes to a step S4 since the CPU of the controller 20 determines that the vehicular running state falls under the follow-up run control state.

At the step S4, the CPU of the controller 20 reads the shift command signal SS from the shift mechanism 11 to determine whether the shift lever 11a has been selectively operated from the drive range (D) to the 2-nd speed range. If the shift lever 11a is not selectively operated at the 2nd speed range (No), the present timer interrupt routine is ended.

If the CPU of the controller 20 determines that the shift range is selectively operated from the drive range (D range) to the 2nd-speed range (Yes) at the step S4, the routine goes to a step S5. At the step S5, the CPU of the controller 20 determines if the engine speed N2nd in the selection of the 2nd-speed range with the shift lever 11a is in excess of a present engine threshold value $N_{TH}$. If N2nd$\leq N_{TH}$ (No), the present timer interrupt routine is ended since the CPU of the controller 20 determines that the engine speed as the vehicular motion falls within an allowable range. If N2nd<$N_{TH}$ (Yes) at the step S5, the routine goes to a step S6 since the CPU of the controller 20 determines that the engine speed falls out of the allowable range. At the step S6, the follow-up run control release flag FF is set to "1" representing the released state and the present timer interrupt routine is ended.

On the other hand, if the result of determination at the step S3 does not indicate that the present vehicular run state falls under the follow-up run control state (No) at the step S3, the routine goes to a step S7. At the step S7, the CPU of the controller 20 reads the present range position according to the shift command signal SS from the shift mechanism 11. At the next step S8, the CPU of the controller 20 determines if the range position is at the drive range (D). If the shift position=D range (Yes) at the step S8, the routine jumps to a step S11. If the shift position≠D range (No), the routine goes to a step S9.

If the shift position=2nd speed range (Yes) at the step S9, the routine goes to a step S10. If the shift position≠2nd speed range (No), the present timer interrupt routine is ended. If the shift range indicates an acceleration range (shift position=2nd-speed range, Yes) at the step S9, the routine goes to a step S10.

At the step S10, the CPU of the controller 20 determines if the engine speed N2nd in the 2nd-speed range is in excess of the engine speed threshold value $N_{TH}$. If N2nd>$N_{TH}$ (Yes) at the step S10, the CPU of the controller 20 determines that the engine speed falls within the allowable range and the present timer interrupt routine is ended. If N2nd$\leq N_{TH}$ (No) at the step S10, the routine goes to the step S11. At the step S1, the follow-up run control release flag FF is reset to "0" to allow the follow-up run control and the follow-up run managing procedure shown in FIG. 2 is ended.

Figure 3:
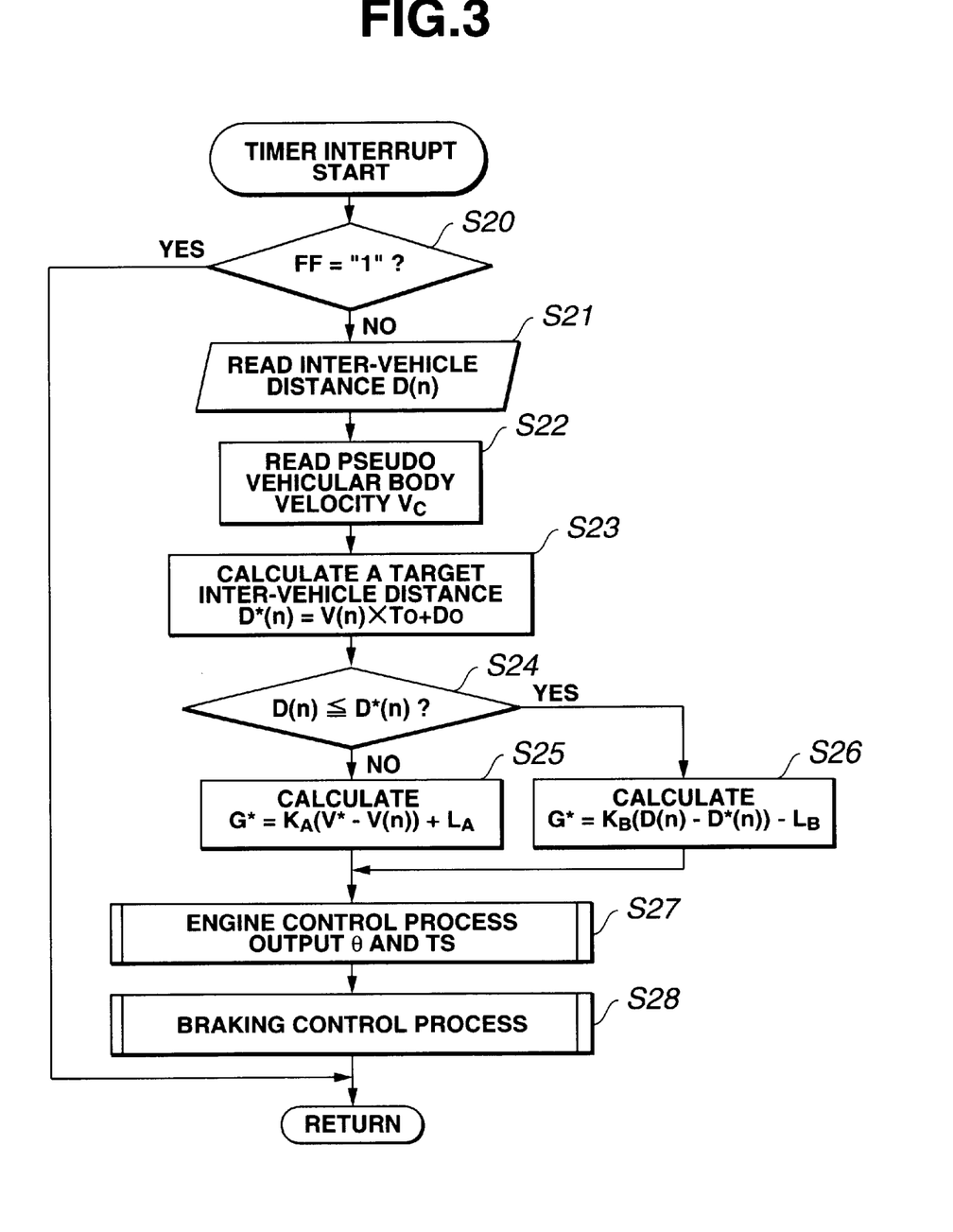
FIG. 3 is an operational flowchart representing one example of a follow-up run control procedure executed by the controller shown in FIGS. 1A and 1B.

Next, FIG. 3 shows the follow-up run control procedure in the first embodiment.

The timer interrupt routine in the same manner as FIG. 2 is executed in the same manner as FIG. 2 is executed whenever the predetermined interval of time (for example, 5 milliseconds) has passed with respect to the main program.

At a step S20, the CPU of the controller 20 determines if the follow-up run release flag FF is set to "1". If FF="1" (Yes) at the step S20, the CPU of the controller 20 determines that the follow-up run control has been released. Then, the present timer Interrupt routine is ended to return to the predetermined main program. If FF="0" at the step S20, the CPU of the controller 20 determines that the follow-up run control has been allowed and the routine goes to a step S21.

At the step S21, the CPU of the controller 20 reads the inter-vehicle distance D between the vehicle and the actual preceding vehicle detected by the inter-vehicle distance sensor 12.

The routine goes to a step S22.

In the same manner as the step S1 in FIG. 2, the vehicular velocity V(n) is calculated at the step S22 on the basis of the detected values VWL and VWR of the road wheel velocities form the respective road wheel velocity sensors 13L and 13R. Then, the routine goes to a step S23.

At the step S23, the CPU of the controller 20 calculates a target inter-vehicle distance D* between the preceding vehicle and the vehicle in accordance with the following equation (1) form the vehicular velocity V(n) and a time duration $T_0$ (inter-vehicle time duration) for which the vehicle reaches to a position L0 behind the present preceding vehicle.

$$D^*(n)=Vc(n)\times T_0+D_0 \quad (1)$$

By adopting a concept called the inter-vehicle time duration, the target inter-vehicle distance D* is set so that the vehicular velocity becomes fast, the inter-vehicle distance becomes wide. In the equation (1), $D_0$ denotes an inter-vehicle distance when the vehicle stops.

At the next step S24, the CPU of the controller 20 determines if the inter-vehicle distance D(n) is equal to or lower than the target inter-vehicle distance D*(n).

If D(n)>D*(n) at the step S24, the CPU of the controller 20 determines that the actual inter-vehicle distance D(n) is in excess of the target inter-vehicle distance D*(n) and it is necessary to narrow the inter-vehicle distance in the acceleration state and the routine goes to a step S25.

At the step S25, the CPU of the controller 20 a calculates the target vehicular velocity variation rate G* in accordance with the equation (2) on the basis of a preset target vehicular velocity V* and update and stores the corresponding memory area on the vehicular velocity variation rate and the routine goes to a step S27.

$$G^*=K_A\times(V^*-V(n))+L_A \quad (2)$$

It is noted that, in the equation (2), $K_A$ denotes an inter-vehicle time duration gain and $L_A$ denotes a constant.

On the other hand, if D(n)$\leq$D*(n) at the step S24, the CPU of the controller 20 determines that the inter-vehicle distance is rather shorter than the target inter-vehicle distance D*(n) and it is necessary to widen the inter-vehicle distance in the deceleration state and the routine goes to the step S27.

At the step S27, the CPU of the controller 20 calculates a command value θ of an opening degree of the engine throttle valve for the engine output controller 9, an up-shift/down-shift command value TS to make an up-shift or down-shaft of the gear for the automatic transmission controller 10, and outputs these command values to the controllers 9 and 10 in which an engine output control module is executed and a gear shift control is executed and the routine goes to a step S30.

If G*>0 and the vehicle is being accelerated, the command value θ of the throttle valve is calculated as follows: a variation rate Δθ of the opening angle of the throttle valve is calculated which increases according to the increase in the target vehicular velocity variation rate.

If G*>0, the variation rate Δθ of the opening degree of the throttle valve is calculated which increases in an negative direction as the target vehicular velocity variation rate increases in the negative direction while the target vehicular velocity variation rate G* reaches from zero to a negative predetermined value −Gs. The calculated variation rate Δθ of the opening degree of the throttle valve is added to the present command value θ of the throttle valve. If the target vehicular velocity variation rate G* is in excess of the negative predetermined value −Gs, the command value θ of the throttle valve is set to "0" or its neighboring value.

The up-shift/down-shift command value TS is calculated on the basis of the calculated command value θ of the opening degree of the throttle valve and the vehicular velocity V(n), referring to a gear shift schedule map in the same manner as the gear shift control in the normally available automatic transmission 3.

At the step S28, the CPU of the second controller 20 calculates the target braking pressure $P_B^*$ on the basis of the target vehicular velocity variation rate G* stored in the corresponding memory location and outputs the target $P_B^*$ to the braking controller 8. Thereafter, the present interrupt routine is ended and returns to the main routine.

At the step S28, the CPU of the controller 20 refers to a braking pressure calculation map shown in FIG. 4 previously stored in the memory on the basis of the target vehicular velocity variation rate G* to derive the target braking pressure $P_B^*$.

Figure 5:
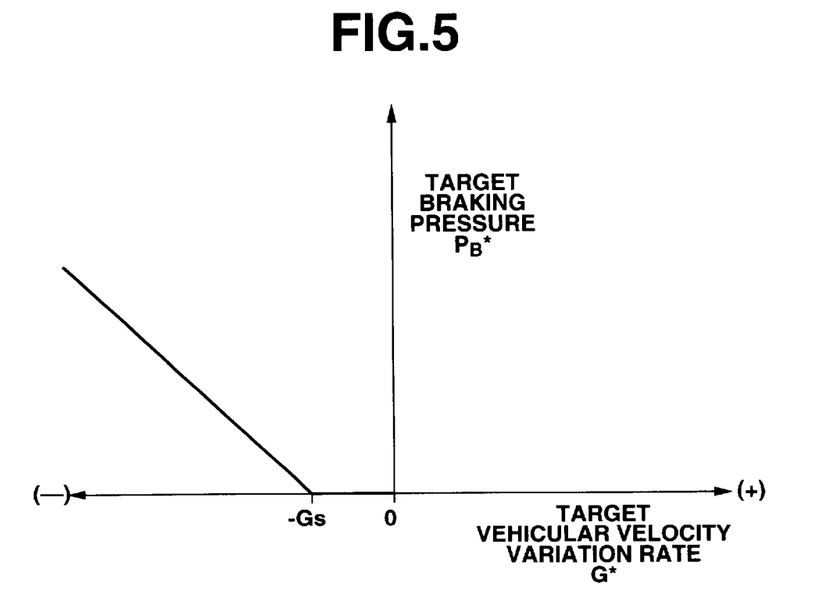
FIG. 5 is a characteristic graph representing a map of a relationship between a target vehicular velocity variation rate and a target braking pressure.

The braking pressure calculation map (two dimensional array) is shown in FIG. 5. With the target vehicular velocity variation rate G* taken along a longitudinal axis and the target braking pressure $P_B^*$ taken along a lateral axis, the target braking pressure $P_B^*$ is maintained at "0" while the target vehicular velocity variation rate G* is positive. While the target vehicular velocity variation rate G* is negative and exceeds the negative predetermined value −Gs, the target braking pressure $P_B^*$ is increased in a linear fashion in proportion to the negative direction increase of the target vehicular velocity variation rate.

FIG. 2 and the step S20 in FIG. 3 corresponds to the follow-up run control means and the steps S21 through S28 correspond to the automatic vehicular velocity controlling means.

Suppose that the vehicle is in the selection state of the drive range in the shift mechanism 11, the follow-up run release flag FF is reset to "0", and the follow-up run control procedure in FIG. 3 is executed.

Therefore, at a timing at which the timer interrupt routine shown in FIG. 2 is executed for each predetermined timing, the CPU of the controller 20 calculates the vehicular velocity V(n) at the step S1. At the step S2, the engine speed N2nd in the 2nd-speed range is calculated.

Since the follow-up run control is being carried out and the shift operation is not carried out, the timer interrupt routine is directly ended from the step S4. Therefore, the follow-up run release flag FF is maintained at the reset state of "0".

Hence, at a timing at which the timer interrupt processing shown in FIG. 3 for each predetermined interval of time, the present timer interrupt routine goes from the step S20 to the step S21. The follow-up run control based on the inter-vehicle distance D and the vehicular velocity V(n) is carried out.

In the follow-up (automatic vehicular velocity) run control, the set vehicular velocity is maintained if no preceding vehicle is present in the forward detection zone of the inter-vehicle distance sensor 13. If the preceding vehicle is present, the CPU of the controller 20 calculates the target vehicular velocity variation rate G* on the basis of the inter-vehicle distance D and the target inter-vehicle distance D*.

Accordingly, either or both of the engine control and braking force control procedures are executed. Hence, the follow-up run control is advanced to maintain the target inter-vehicle distance D* in accordance with the pseudo vehicular body velocity Vc.

Suppose that during the follow-up run control, the vehicle is running, for example, on a descending slope. At this time, if the driver determines that it is necessary to temporarily demand the engine brake so that the shift lever 11a of the shift mechanism 11 is operated to change the shift position from the drive range D to the 2nd-speed. At the execution timing of the follow-up run managing procedure in FIG. 2, the engine speed N2nd at the 2nd-speed is calculated at the step S2 on the basis of the vehicular velocity V(n).

Since the shift operation to the 2nd-speed range is carried out during the follow-up run control, the routine of FIG. 2 transfers from the step S4 to the step S5.

The CPU of the controller 20 determines whether the engine speed N2nd in the 2nd-speed range calculated at the step S2 is in excess of the engine speed threshold value $N_{TH}$.

If N2nd≦$N_{TH}$ at the step S5 (No), the CPU of the controller 20 determines that the engine speed falls within the allowable range and the present timer interrupt routine is directly ended. If N2nd>$N_{TH}$ at the step S5, the routine goes to the step S6 since the CPU of the controller 20 determines that the engine speed falls out of the allowable range.

At the step S6, the flag FF representing the released state of the follow-up run control is set to "1" and the present timer interrupt routine is ended. The follow-up run control shown in FIG. 3 is continued with the follow-up run release flag FF reset to "0".

If the engine speed N2nd in the 2nd-speed range calculated at the step S2 is in excess of the engine speed threshold value NTH, a large engine brake is needed. If the CPU of the controller 20 determines that the engine speed falls out of the allowable range, the routine goes from the step S5 to the step S6 to set the follow-up release flag FF to "1".

If the timer interrupt process shown in FIG. 3 is started, the routine is directly ended via the step S20. Hence, the follow-up run control is released so that the driver can drive the vehicle at the driver's own decided vehicular running state.

Then, if the shift operation is returned to the driver range under the driver's own decided normal vehicular running state, the routine goes from the step S8 to the step S11 to reset the follow-up run release flag FF to "1".

Hence, if the routine is transferred from the step S20 to the step S21, the routine is transferred from the step S20 to the step S21, the routine being automatically returned to the follow-up run control state without a re-open procedure (a re-open operation) for the vehicular driver.

Similarly, if the engine speed N2nd in the 2nd-speed range calculated at the step S2 is equal to or lower than the engine speed threshold value $N_{TH}$, the routine goes to the step S11 via the steps S8 through S10 so that the automatic return from the driver's own decided normal vehicular run state to the follow-up run control state is made.

As described above, even in a case where the shift operation is carried out to enter the 2nd-speed range according to the driver's intention, the follow-up run control is continued when a predicted vehicular behavior (motion), viz., the engine speed N2nd is equal to or lower than the threshold value $N_{TH}$. Consequently, the follow-up run control is released together with the shift operation. A setting to start the follow-up run control again is not required, a burden imposed on the driver is relieved, and a stable run can be assured.

If the shift operation is carried out when the vehicular behavior is in excess of a control range within which the follow-up run control can be carried out, the follow-up run control is released, the vehicular run control state is transferred to the driver's own decided normal driving state under the follow-up run control release state. At this time, since the vehicular running state is automatically returned to the follow-up run control, a resetting to start the follow-up run control is not required, the burden imposed on the driver is relieved, and the stable run can be assured.

(Second Embodiment)

Figure 6:
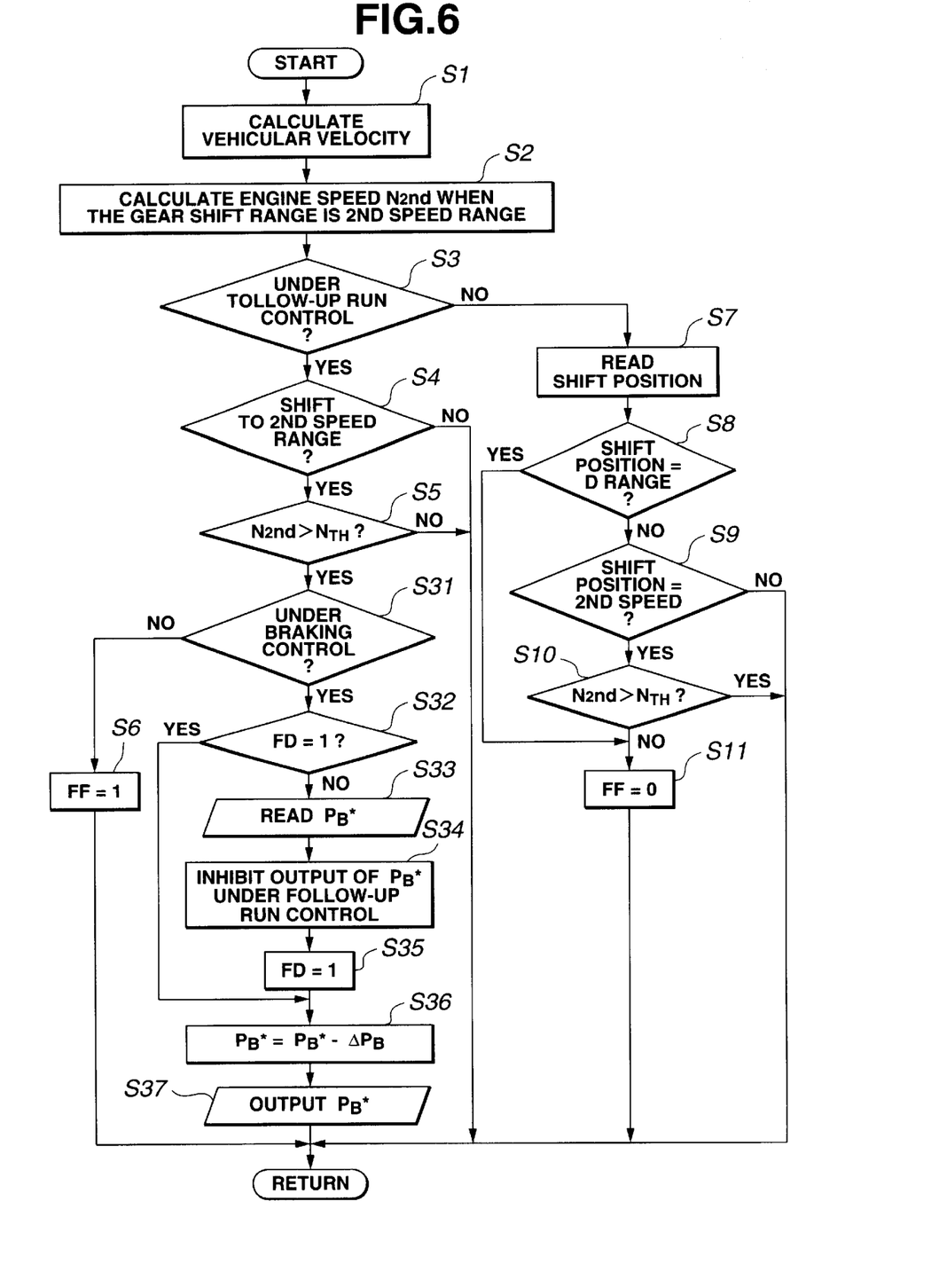
FIG. 6 is another operational flowchart representing one example of the follow-up run managing procedure in a second preferred embodiment of the automatic vehicular velocity controlling apparatus according to the present invention.

FIG. 6 shows an operational flowchart on the follow-up run control procedure in a second preferred embodiment of the automatic vehicular velocity controlling apparatus according to the present invention.

In a case where the vehicular driver carries out the shift operation form the drive range (D range) to the 2nd-speed range during the follow-up run control, the braking control is carried out to widen the inter-vehicle distance in the follow-up run control procedure. At this time, after the braking pressure is gradually reduced to gradually eliminate the braking process to make a non-braking state, the follow-up run control is released.

In the second embodiment, as shown in FIG. 6, a new step S31 is interposed between the steps S31 is interposed between the steps S5 and S6 described in the first embodiment. At the step S31, the CPU of the controller 20 determines whether the target braking pressure PB* calculated at the step S28 in FIG. 3 is positive so as to determine whether the vehicle is under the braking control. If the result of determination at the step S31 indicates that the vehicle is not under the braking control ($P_B^*=0$), the routine goes to the step S6. If not under the braking control, the routine goes to the steps S32 through S37 and the present timer interrupt routine is ended.

The same processing as shown in FIG. 2 is thereafter carried out. Hence, the detailed description on the same numbered steps in FIG. 6 as those shown in FIG. 2 will herein be omitted.

After the step S32, the CPU of the controller 20 determines whether a pressure decrease flag FD is reset to "0" which represents that the braking pressure is not in the pressure decrease state at an initial stage of the pressure decrease and is set to "1" when the braking pressure is in the pressure decrease state.

If the pressure decrease flag FD is reset to "1", the CPU of the controller 20 determines that the pressure decrease state of the braking pressure occurs and jumps directly to the step S36. If the pressure decrease flag FD is reset to "0", the routine goes to a step S33 to read the target braking pressure $P_B^*$ in the follow-up run control procedure of FIG. 3.

At a step S34, the CPU of the controller 20 inhibits the output of the target braking pressure $P_B^*$ in the follow-up run control procedure shown in FIG. 3. At the next step S35, the pressure decrease flag FD is set to "1" representing the pressure decrease state of the braking pressure and, thereafter, the routine goes to a step S36.

At a step S36, the CPU of the controller 20 sets a value of the subtraction of a preset pressure decrease value $\Delta P_B$ from the present target braking pressure PB* (for example, a numerical value by which a pressure decrease velocity of the braking velocity is about 0.5 MPa/s(Mega Pascal per Second) as a new target braking pressure $P_B^*$.

In the second embodiment, in the same manner as described in the first embodiment, suppose that when the shift operation is carried out form the drive range to the 2nd-speed range in the same manner as described in the first embodiment, the engine speed N2nd which is predicted in the 2nd-speed range is in excess of the threshold value $N_{TH}$. In this case, when the braking control is carried out, the target braking pressure PB* to be outputted to the braking controller 8 in the follow-up run control procedure shown in FIG. 3 indicating positive, the routine goes from the step S32 to the step S5 via the step S32. If the pressure decrease flag FD is reset to "0" in the initial stage of the pressure decrease, the CPU of the controller 20 reads the target braking pressure $P_B^*$ calculated at the step S28 the follow-up run control procedure in FIG. 3 at the step S33.

Then, the output of the target braking pressure PB* the follow-up run control procedure shown in FIG. 3 is inhibited and the pressure decrease flag FD is set to "1". Hence, at the next processing, the routine directly jumps from the step S32 to the step S36.

At the step S36, a numerical value of the subtraction of the predetermined pressure decrease value ΔPB* is set as a new target braking pressure PB*. If this pressure decrease process PB* indicates zero or negative, the CPU of the controller 20 determines that the braking control is ended, the routine goes from the step S31 to the step S36, and, then, the follow-up run control is released.

In the second embodiment, the shift operation from the drive range to the 2nd -speed range is carried out. At this time, if the engine speed N2nd is in excess of the threshold value, the target braking pressure PB* is gradually reduced. Hence, since the variation rate to widen the inter-vehicle distance D is gradually reduced, the driver can recognize that the follow-up run control is released. If the present braking state is in the non-braking state due to the pressure decrease control, the follow-up run control is released so that the smooth transfer to the run control state with the driver can be made and the safety can be assured.

(Third Embodiment)

Figure 7:
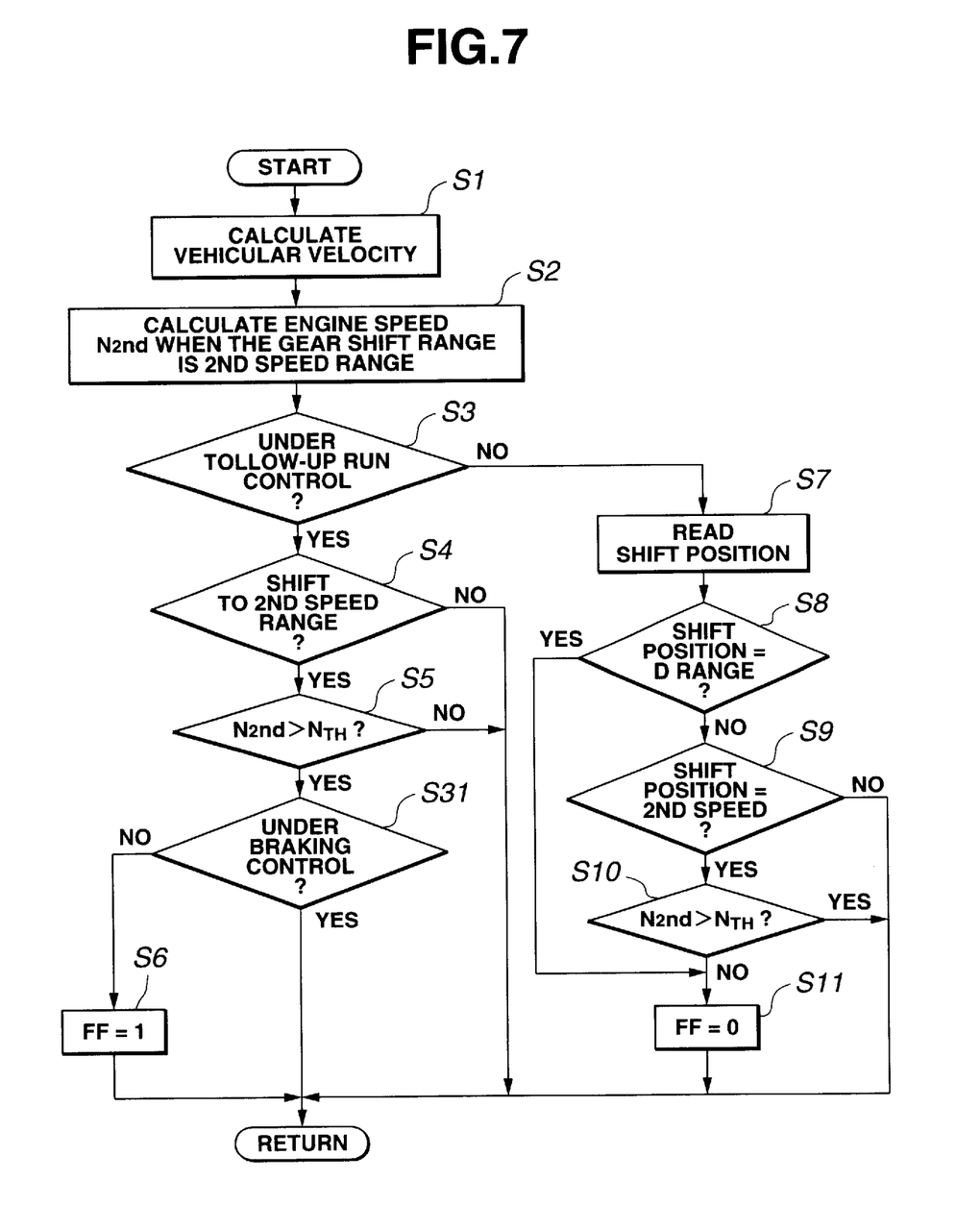
FIG. 7 is another operational flowchart representing one example of the follow-up run managing procedure in a third preferred embodiment of the automatic vehicular velocity controlling apparatus according to the present invention.

FIG. 7 shows an operational flowchart of the follow-up run control procedure carried out in a third preferred embodiment of the automatic vehicular velocity controlling apparatus according to the present invention.

In the third embodiment, suppose that the 2nd-speed range is carried out as described in the second embodiment and the engine speed N2nd is in excess of the threshold value $N_{TH}$. At this time, if the braking control procedure to widen the inter-vehicle distance is carried out in the follow-up run control procedure, the follow-up run control is released waiting for the completion of the braking control procedure.

That is to say, in the third embodiment shown in FIG. 7, the step S31 is interposed between the steps S5 and S6 in FIG. 2 to determine whether, in the follow-up run control procedure in FIG. 3 which is the same as described in the second embodiment, the braking control is being executed.

If the result of determination at the step S31 indicates that the brake control is being carried out, the present timer interrupt processing is ended. If the braking control is ended or the braking control is not carried out, the routine goes to the step S6.

The other steps in FIG. 7 are the same as those steps shown in FIG. 2. The detailed description of these other steps will herein be omitted.

In the third embodiment, suppose that the shift operation is carried out from the drive range to the 2nd-speed range is in excess of the predetermined threshold value $N_{TH}$. In this case, when the braking control is being executed, the target braking pressure PB* for the braking controller 8 in the follow-up run control procedure indicates positive. At this time, the routine goes from the step S5 to the step S31 to directly end the interrupt routine. Thus, the follow-up run procedure in FIG. 3 is continued, the braking control is continued to widen the inter-vehicle distance D.

If the inter-vehicle distance D reaches to an appropriate value, the target vehicular velocity variation rate G* gives zero to suspend the braking control. Hence, the target braking pressure PB* indicates zero.

In details, the routine in FIG. 7 goes from the step S31 to the step S6.

If the follow-up run release flag FF is set to "1", with the follow-up run release flag FF set to "1", with the follow-up run control released and the braking state released during the braking control, the inter-vehicle distance D can be avoided from being narrowed.

In the second and third embodiments, whether the follow-up run control is in the braking control or not depends on whether the target braking pressure PB* is positive. However, the controller may determine that the follow-up run control is in the braking control only during the braking control process in which the negative target vehicular velocity variation rate G* in the negative direction to widen the inter-vehicle distance D at the step S26 in the follow-up run control procedure shown in FIG. 3. Thus, the follow-up run control procedure in each embodiment may be carried out only when the braking control to widen the inter-vehicle distance is carried out.

In addition, in each of the first, second, and third embodiments, as the condition to release the follow-up run control and, thereafter, to recover the follow-up run control is that the shift position return operation from the 2nd-speed range to the D range is carried out and the engine speed N2nd in the 2nd-speed range is equal to or lower than the predetermined threshold value $N_{TH}$. However, the condition described above may be only that the shift position return operation is carried out from the 2nd-speed range to the D range.

Furthermore, in each of the first, second, and third embodiments, the automatic transmission 3 is the four-speed automatic transmission. However, the present invention is applicable to a five speed automatic transmission. If the present invention is applied to the five-speed automatic transmission, the shift operation from the drive range (D range) to the third-speed (3rd-speed range) occurs, the engine speed in the 3rd-speed range is predicted, and the CPU of the controller 20 may determine whether this is in excess of the threshold value to determine whether the follow-up run control is released.

Furthermore, in each of the first, second, and third preferred embodiments, the vehicular velocity V(n) is calculated on the basis of the detected values of the road wheel velocity sensors 13L and 13R. However, the vehicular body velocity may be estimated from the four wheel road wheel velocities of the front left and right and rear left and right road wheels of the vehicle, or may be estimated on the basis of detected values of the vehicular variation rate on the longitudinal acceleration sensor, and may be detected from the revolution speed of the transmission.

Furthermore, in each embodiment, the follow-up run managing procedure is used to manage whether the follow-up run control is executed. However, both of the follow-up run control and the follow-up run managing procedures may be integrated into a single timer interrupt processing.

In each embodiment, the automatic transmission 3 is installed on the output end of the engine 2. However, the present invention is applicable to a continuously variable transmission (CVT). In this case, the present invention is applied to a case where the shift operation occurs from the drive range (D range) at which all gear ranges are used to a gear range maintaining range in which a particular third-speed range or second-speed range is selected.

In each of the first through third embodiments, the present invention is applicable to the rear-wheel-drive vehicle.

However, the present invention may be applied to a front-wheel-drive vehicle or a four-wheel drive (4WD) vehicle. Furthermore, the present invention may be applied to a hybrid vehicle in which both of the engine 2 and an electric motor are used. In this case, in place of the single engine output controller, a motor controller may be used in addition to the engine output controller. The present invention may be applied to an electric vehicle. In this case, the engine output controller may be replaced with the electric motor controller.

It is noted that the automatic vehicular velocity controlling section defined in the claims includes the follow-up run control purpose controller if the preceding vehicle is present and the cruise speed control if no preceding vehicle is present.

The entire contents of a Japanese Patent Application No. Heisei 11-8368 (filed in Japan on Jan. 14, 1999) are herein incorporated by reference.

Although the present invention has been described above by reference to certain embodiments of the present invention, the present invention is not limited to the embodiments described above.

Modifications and variations of the embodiments described above will occur to those skilled in the art, in the light of the above teachings. The scope of the present invention is defined with reference to the following claims.

What is claimed is:

1. An apparatus for automatically controlling a vehicular velocity for a vehicle, comprising:

an inter-vehicle distance detector to detect an inter-vehicle distance of the vehicle to a preceding vehicle which is running ahead of the vehicle;

a target vehicular velocity variation rate calculating section that calculates a target vehicular velocity variation rate to make the detected inter-vehicle distance substantially equal to a target inter-vehicle distance;

an automatic vehicular velocity controlling section enabled to perform an automatic vehicular velocity control to maintain the target vehicular velocity variation rate calculated by the target vehicular velocity variation rate calculating section;

a shift operation detector to detect whether a range selection by a vehicular driver occurs from a drive range to a gear speed maintaining range and vice versa;

a vehicular motion predicting section that predicts a vehicular motion at the gear speed maintaining range when the shift operation detector detects that the range selection by the vehicular driver occurs from the drive range to the gear speed maintaining range;

an automatic vehicular velocity control release determining section that determines whether the vehicular motion predicted by the vehicular motion predicting section falls within an allowable range when the shift operation detector detects that the range selection by the vehicular driver occurs from the drive range to the gear speed maintaining range; and an automatic vehicular velocity control releasing section that releases the automatic vehicular velocity control by the automatic vehicular velocity controlling section when the vehicular motion falls out of the allowable range but continues the automatic vehicular velocity control by the automatic vehicular velocity controlling section when the vehicular motion falls within the allowable range.

2. An apparatus for automatically controlling a vehicular velocity for a vehicle as claimed in claim 1, wherein when the shift operation detector detects that the range selection by the vehicular driver occurs from the gear speed maintaining range to the drive range while the automatic vehicular velocity control by the automatic vehicular velocity controlling section is released, the automatic vehicular velocity control releasing section, in turn, enables the automatic vehicular velocity control by the automatic vehicular velocity controlling section.

3. An apparatus for automatically controlling a vehicular velocity for a vehicle as claimed in claim 1, wherein when the automatic vehicular velocity control release determining section determines that the vehicular motion predicted by the vehicular motion predicting section falls within the allowable range while the automatic vehicular velocity control by the automatic vehicular velocity controlling section is released, the automatic vehicular velocity control releasing section enables the automatic vehicular velocity control by the automatic vehicular velocity controlling section.

4. An apparatus for automatically controlling a vehicular velocity for a vehicle as claimed in claim 1, wherein the automatic vehicular velocity control release determining section further comprises a braking control determining section that determines whether the automatic vehicular velocity control performed by the automatic vehicular velocity controlling section is under a braking control when such a release condition is established that the shift operation detector detects that the range selection by the vehicular driver occurs from the drive range to the gear speed maintaining range and the vehicular motion predicted by the vehicular motion predicting section falls out of the allowable range and wherein the automatic vehicular velocity control releasing section releases the automatic vehicular velocity control when a braking pressure for a vehicular braking system is reduced by a predetermined such that a variation in the vehicular velocity variation rate is in a middle between zero degree and 90° degree and, thereafter, becomes a non-braking condition.

5. An apparatus for automatically controlling a vehicular velocity for a vehicle as claimed in claim 1, wherein the automatic vehicular velocity control release determining section further includes a braking control determining section that determines whether the automatic vehicular velocity control performed by the automatic vehicular velocity controlling section is executing the braking control when such a release condition is established that the shift operation detector detects that the range selection by the vehicular driver occurs from the drive range to the gear speed maintaining range and the vehicular motion predicted by the vehicular motion predicting section falls out of the allowable range and wherein the automatic vehicular velocity control releasing section releases the automatic vehicular velocity control after the automatic vehicular velocity controlling section has ended the braking control.

6. An apparatus for automatically controlling a vehicular velocity for a vehicle as claimed in claim 1, wherein the vehicular motion predicting section further includes a vehicular velocity detector to detect a vehicular velocity; an engine speed calculating section that calculates an engine speed when the range selection by the vehicular driver through a shift mechanism of a four-speed automatic transmission of the vehicle occurs from the drive range to a 2nd-speed range according to the vehicular velocity; and a comparing section that comprises the engine speed N2nd with a predetermined threshold value $N_{TH}$ to determine whether the engine speed N2nd is equal to or lower than the predetermined threshold value $N_{TH}$.

7. An apparatus for automatically controlling a vehicular velocity for a vehicle as claimed in claim 6, wherein the automatic vehicular velocity control releasing section includes a vehicular run control release flag FF which is reset to "0" representing that the automatic vehicular velocity control by the automatic vehicular velocity controlling section is enabled to be continued when the shift operation detector detects that the range selection by the vehicular driver occurs from the drive range to the 2nd-speed range and the engine speed N2nd is equal to or lower than the predetermined threshold value $N_{TH}$ and which is set to "1" representing that the automatic vehicular velocity control by the automatic vehicular velocity controlling section is released when the shift operation detector detects that the range selection by the vehicular driver occurs from the drive range to the 2nd-speed range and the engine speed N2nd in the 2nd-speed range is in excess of the predetermined threshold value.

8. An apparatus for automatically controlling a vehicular velocity for a vehicle as claimed in claim 7, wherein when the shift operation detector detects that the range selection by the vehicular driver occurs from the 2nd-speed range to the D range while the vehicular run control release flag FF is set to "1", the vehicular run control release flag FF is reset to "0" to enable the automatic vehicular velocity control by the automatic vehicular velocity controlling section.

9. An apparatus for automatically controlling a vehicular velocity for a vehicle as claimed in claim 7, wherein when the shift operation detector detects that the engine speed N2d in the 2nd-speed range is equal to or lower than the predetermined threshold value $N_{TH}$ while the vehicular run control release flag FF is set to "1", the vehicular run control release flag FF is reset to "0" to enable the automatic vehicular velocity control section by the automatic vehicular velocity controlling section.

10. An apparatus for automatically controlling a vehicular velocity for a vehicle as claimed in claim 9, wherein the automatic vehicular velocity control release determining section further includes a braking control determining section that determines whether the automatic vehicular velocity control performed by the automatic vehicular velocity controlling section is executing the braking control when such a release condition is established that the shift operation detector detects that the range selection by the vehicular driver occurs from the drive range to the gear speed maintaining range and the vehicular motion predicted by the vehicular motion predicting section falls out of the allowable range when the braking control determining section determines that the automatic vehicular velocity control performed by the automatic vehicular velocity controlling section is in the braking control to reduce the vehicular velocity according to whether a target braking pressure $P_B^*$ calculated by the automatic vehicular velocity controlling section is positive and wherein the automatic vehicular velocity control release determining section further includes a pressure decrease flag FD which is reset to "0" at an initial stage of the braking pressure decrease and which is set to "1" when the braking pressure decrease is carried out; and a flag status determining section that determines whether the pressure decrease flag FD is set to "1" after the automatic vehicular velocity control release flag FF is set to "0"; and an inhibiting section that inhibits an output of the target braking pressure $P_B^*$ to a braking controller in the vehicular braking system in the automatic vehicular velocity control when the pressure decrease flag FD is set to "0"; and a setting section that sets the pressure decrease flag FD to "1" after the output of the target braking pressure $P_B^*$ in the automatic vehicular velocity control is inhibited.

11. An apparatus for automatically controlling a vehicular velocity for a vehicle as claimed in claim 10, wherein the automatic vehicular velocity control releasing section further includes a subtractor that subtracts a predetermined pressure decrease coefficient $\Delta P_B$ from the target braking pressure $P_B^*$ as follows: $P_B^*=P_B^*-\Delta P_B$ and the automatic vehicular velocity controlling section outputs the target braking pressure PB* to the braking controller to the vehicular braking system and wherein the automatic vehicular velocity control releasing section releases the automatic vehicular velocity control when the target braking pressure $P_B^*$ indicates zero or negative.

12. An apparatus for automatically controlling a vehicular velocity for a vehicle as claimed in claim 11, wherein the predetermined pressure decrease coefficient is approximately 0.5 MPa/s.

13. An apparatus for automatically controlling a vehicular velocity for a vehicle as claimed in claim 9, wherein the automatic vehicular velocity control release determining section further includes a braking control determining section that determines whether the automatic vehicular velocity controlling section is under a braking control when the shift operation detector detects that the range selection by the vehicular driver occurs from the drive range to the 2nd-speed range and the engine speed N2nd in the 2nd-speed range is in excess of the predetermined threshold value $N_{TH}$ and wherein the automatic vehicular velocity control releasing section releases the automatic vehicular velocity control by the automatic vehicular velocity controlling section with the vehicular run control release flag FF set to "1" after the automatic vehicular velocity controlling section has ended the braking control when the braking control determining section determines that the automatic vehicular velocity control is under the braking control.

14. An apparatus for automatically controlling a vehicular velocity for a vehicle, comprising:

inter-vehicle distance detecting means for detecting an inter-vehicle distance of the vehicle to a preceding vehicle which is running ahead of the vehicle;

target vehicular velocity variation rate calculating means for calculating a target vehicular velocity variation rate to make the detected inter-vehicle distance substantially equal to a target inter-vehicle distance;

automatic vehicular velocity controlling means enabled for performing an automatic vehicular velocity control to maintain the target vehicular velocity variation rate calculated by the target vehicular velocity variation rate calculating means;

shift operation detecting means for detecting whether a range selection by a vehicular driver occurs from a drive range to a gear speed maintaining range and vice versa;

vehicular motion predicting means for predicting a vehicular motion at the gear speed maintaining range when the shift operation detector detects that the range selection by the vehicular driver occurs from the drive range to the gear speed maintaining range; and automatic vehicular velocity control release determining means for determining whether the vehicular motion predicted by the vehicular motion predicting means falls within an allowable range when the shift operation detecting means detects that the range selection by the vehicular driver occurs from the drive range to the gear speed maintaining range and for releasing the automatic vehicular velocity control by the automatic vehicular velocity controlling means when the vehicular motion falls out of the allowable range but for continuing the automatic vehicular velocity control by the automatic vehicular velocity controlling means when the vehicular motion falls within the allowable range.

15. A method for automatically controlling a vehicular velocity for a vehicle, comprising:

detecting an inter-vehicle distance of the vehicle to a preceding vehicle which is running ahead of the vehicle;

calculating a target vehicular velocity variation rate to make the detected inter-vehicle distance substantially equal to a target inter-vehicle distance;

performing an automatic vehicular velocity control to maintain the target vehicular velocity variation rate;

detecting whether a range selection by a vehicular driver occurs from a drive range to a gear speed maintaining range and vice versa;

predicting a vehicular motion at the gear speed maintaining range when detecting that the range selection by the vehicular driver occurs from the drive range to the gear speed maintaining range; and determining whether the vehicular motion predicted falls within an allowable range when detecting that the range selection by the vehicular driver occurs from the drive range to the gear speed maintaining range;

releasing the automatic vehicular velocity control in a case when the vehicular motion falls out of the allowable range; and continuing the automatic vehicular velocity control in a case when the vehicular motion falls within the allowable range.

* * * * *